A. H. NEUREUTHER.
AUTOMATIC PINION CUTTING MACHINE.
APPLICATION FILED OCT. 8, 1908.
953,752.
Patented Apr. 5, 1910.
3 SHEETS—SHEET 2.
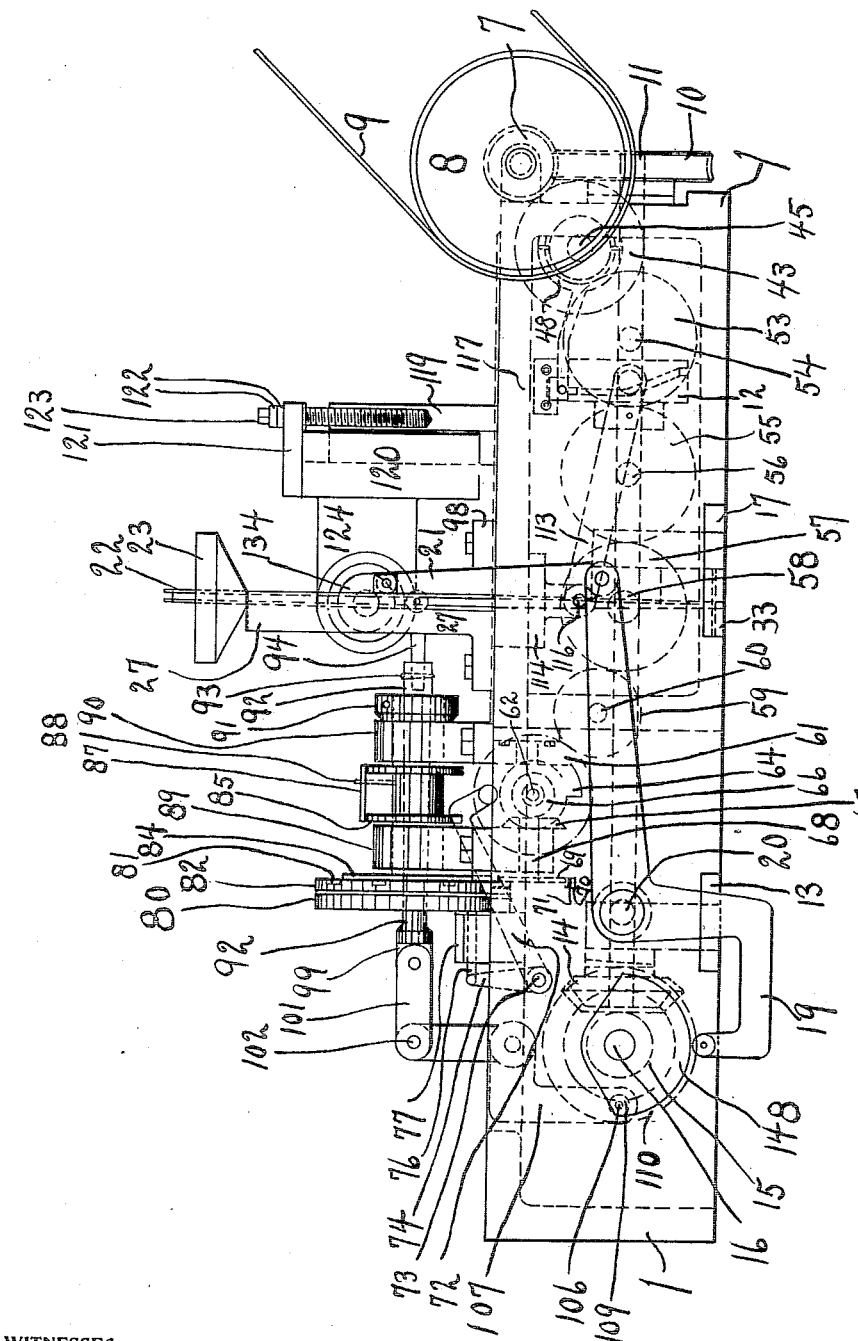
Fig. II.
WITNESSES:
William A. Radtke
Oscar W. Dauber
INVENTOR
Andrew H. Neureuther

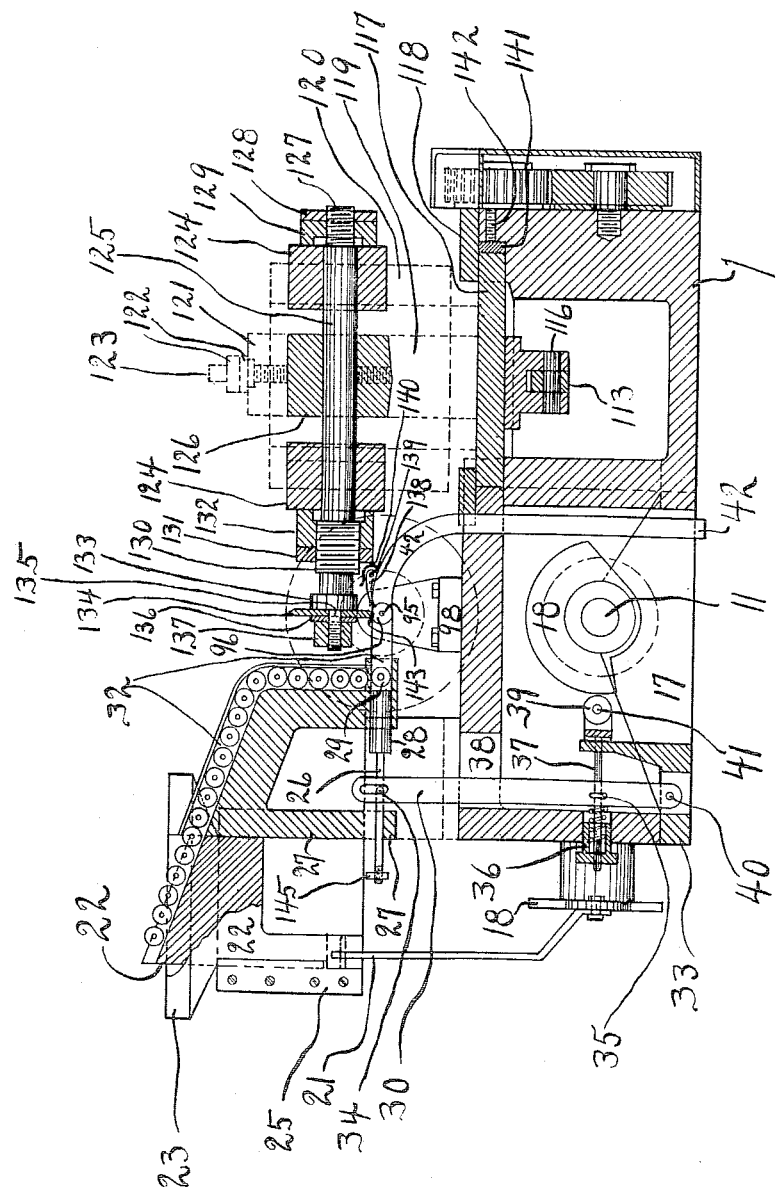

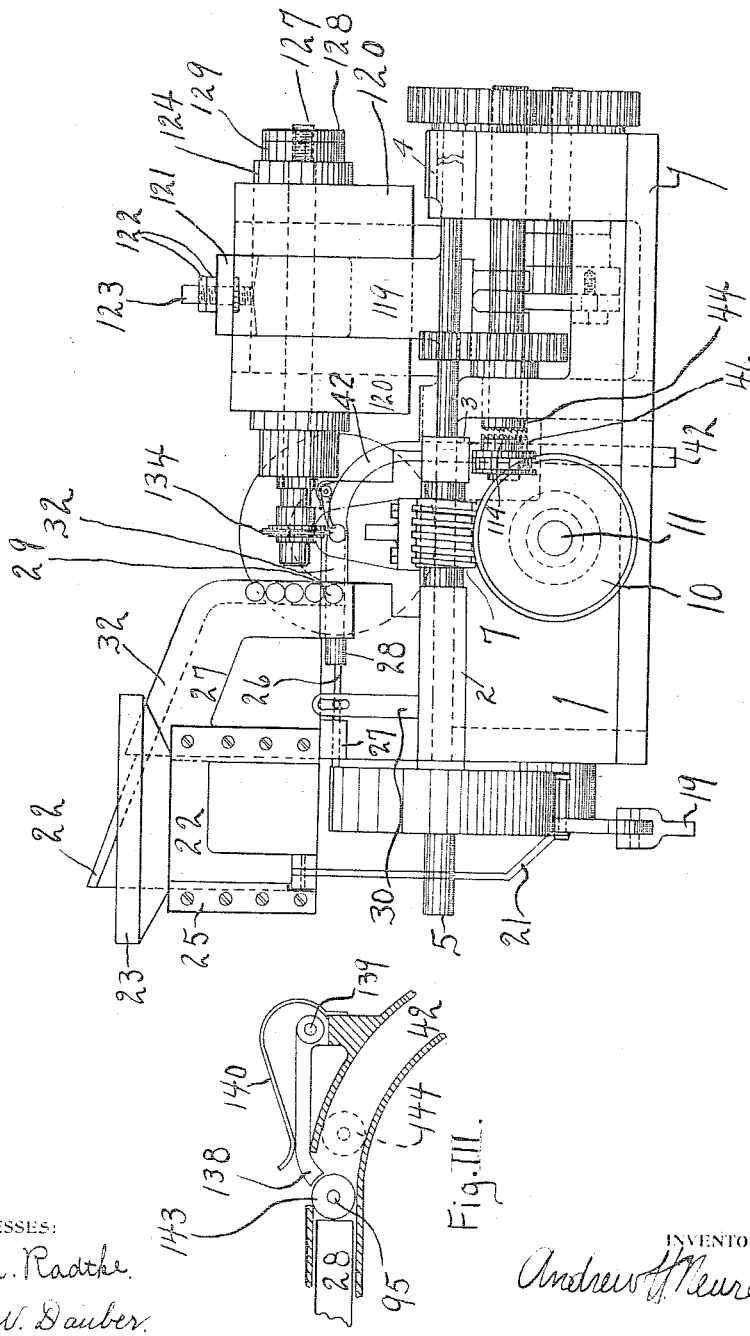

UNITED STATES PATENT OFFICE.

ANDREW H. NEUREUTHER, OF PERU, ILLINOIS, ASSIGNOR TO THE WESTERN CLOCK MANUFACTURING COMPANY, OF LA SALLE, ILLINOIS, A CORPORATION OF ILLINOIS.

AUTOMATIC PINION-CUTTING MACHINE.

953,752.  Specification of Letters Patent.  Patented Apr. 5, 1910.

Original application filed May 21, 1907, Serial No. 374,934. Divided and this application filed October 8, 1908. Serial No. 456,813.

*To all whom it may concern:*

Be it known that I, ANDREW H. NEUREUTHER, a citizen of the United States, residing at Peru, in the county of Lasalle and State of Illinois, have invented a new and useful Automatic Pinion-Cutting Machine, of which the following is a specification.

This application is a division of application No. 374,934, filed May 21st, 1907.

My invention relates to machines for cutting the teeth of pinions and gears and has for its object the production of a machine in which it is only necessary to dump any number of pinion blanks into a hopper, when they will be erected (righted), stacked, brought against a gaging device, forced on to an arbor, ready to be operated upon and when operation is finished, the blank again released and conducted from the machine, the entire process being performed by the machine itself. I attain these objects by the mechanism illustrated in the accompanying drawings, in which—

Figure 1 is a vertical cross-sectional view through the feeding device. Fig. 2 is a right-hand side view. Fig. 3 is an enlarged cross-sectional view of the spring loaded gage for lining the blank with the arbor. Fig. 4 is a front end view of my machine.

In the drawing, 1 represents the frame of my machine, 2, 3 and 4 are bearings in the frame 1 which journal the shaft 5 by means of which the entire driving mechanism of the machine is driven by means of pulley 8 and belt 9. Rigidly fastened to shaft 5 is a worm 7, which engages a worm wheel 10 which is rigidly fastened to a shaft 11, which is journaled in the front end of the frame 1 and in bracket bearings 13 and 17 fastened to the frame of the machine. Shaft 11 terminates with a bevel gear 14 which engages with a bevel gear 15 which is rigidly mounted on a shaft 16 which is journaled in the frame of the machine as shown. Shaft 16 carries cams 110 and 148, both rigidly fastened to it by means of the pins shown. Cam 110 has a groove which carries a roll 109 which is journaled on a pin 106 which is rigidly fastened to a lever 107, which is journaled on a pin 105 mounted in the frame of the machine. The upper end of lever 107 terminates in a projection 103, which has an aperture through which passes a pin 102. On this pin 102 are journaled two links 101 whose other ends have apertures which are journaled on pins projecting from the collar 99, also journaled on the projecting part of arbor 92. Nuts 100 retain said collar 99 in its proper position as shown. From this it is seen that cam 110 controls the longitudinal motion and position of arbor 92, causing it to remain stationary or to reciprocate, depending on the form of the groove in cam 110.

On shaft 16 is rigidly mounted a cam 148 which actuates a lever 19 journaled on a pin 20 fastened to the frame of the machine. The other end of lever 20 is pivotally connected to a link 21 whose upper end is journaled on a pin fastened in the lower end of sliding member 22. Sliding member 22 is reciprocated vertically by means of cam 148, any number of times per revolution, depending on the form of the said cam 148. Said member 22 as above mentioned slides in the standard 27, which supports a hopper 23 on its upper extremity. The upper end of member 22 is cut off on an angle with the vertical, and has a slot through the entire top surface. The shape of this slot depends on the shape of the pinion or gear blank which it is desired to feed. The hopper 23 is generally filled with the blanks and the sliding member 22 works downward beneath the bottom of the hopper and comes up through the blanks; those which are erected or righted in the slot remain so until, when the sliding member 22 is at its upper limit of travel, the slot in member 22 is brought in line with a runway 32 whose lower vertical part terminates in a horizontal runway, which at once forms a place for the stack of blanks in the vertical runway to rest upon and a guideway for bringing the hole in the blank in line with the arbor end 95 it is forced on to. Horizontal guideway 32 terminates in the curved runway or tube 42, which conducts the finished pinion or gear wheel away from the machine. Guideway 32 has a notch 143 cut out of its upper edge so that the rotating cutter 134 can cut the blank 96 and has openings on each side which permit the small staking end 95 of staking arbor 94, which is fastened to above mentioned reciprocating arbor 92, to pass through said guide or runway and said pinion into the bearing or standard 98, which is rigidly fastened to the frame. The upper part of tube 42 contains a combined blank gaging and releasing mechanism which is composed of a piece 138 shaped as shown (see Fig. 3) journaled to the tube at 139 and held in its normal position by spring 140 as shown in the above mentioned Fig. 3.

28 is a plunger which reciprocates in the horizontal part of runway 32 and is shown in Fig. 1 in the act of taking a blank from the stack of blanks, while in Fig. 3 plunger 28 is shown placing the blank against the gage 138 after having pushed the blank 144 through the gage as indicated. Plunger 28 has a stem 26 which is journaled in frame 27, and has the end threaded for a nut 145 which serves to adjust the distance plunger 28 is thrown, so as to bring the blank up to the gage 138 and the center hole of the blank in line with staking arbor 95. Plunger 28 is actuated by means of a lever 30 which is pivotally connected to it by pin 34 and pivotally connected by means of pin 40 to the standard 33, which is fastened to the frame of the machine. Said lever 30 is further pivotally connected to a rod 37, which is also journaled in standard 33 and in a bushing which is threaded to the frame of the machine at 36. Immediately after the rod 37 passes through the standard 33 it is formed into a slot which carries a roll 39, which is journaled on a pin 41 fastened in the said rod 37. On the other end of rod 37 is a spiral spring shown, which keeps the roll 39 against the cam 18 which is rigidly fastened to the shaft 11 above mentioned. From the shape of cam shown, it is evident that lever 30, and hence plunger 28, has an intermittent reciprocating motion, and pushes out or releases a blank and puts another from the stack of blanks in its place. The threaded bushing at 36 serves to screw up the tension of the spring on rod 37. It may be noted here that when the runway is full of blanks as shown in Fig. 1, the blanks simply ride up and down on the sliding member 22 until there is room for one or more blanks in the stationary runway.

25 is the guide plate on standard 27 to retain the sliding member 22 in its position.

The arbor 92 as above mentioned has an intermittent reciprocating motion, moving forward when forcing on a blank against the standard 98, in which the end 95 of arbor 92 is journaled, and backward into the standard 98 in which it is also journaled, thereby releasing the blank from the arbor end 95 and leaving it free to be forced through the gage 138 by plunger 28.

In operation, my machine works as follows:—Pinion blanks are put into hopper 23, the reciprocating sliding member 22 erects or rights them by means of its slot and they run into runway 32 by their own weight and are stacked in the vertical part of 32, when plunger 28 in horizontal part of runway 32 comes in, removes one blank from the bottom of the vertical stack in 32 and forces the blank along until it comes against the spring loaded gage 138 and is held in position by the plunger 28 and said gage 138 until cam 110 forces, by means of the intervening linkages, the small end 95 of arbor 92 through the aperture of the blank 96. As soon as the blank is staked, and the desired operations are performed on the blank, the cam 110, through the lever and linkages shown, pulls the arbor 92 back again, sliding the blank 96 against the standard and withdrawing the small arbor end 95 from the blank 96, leaving it free against the gage, when plunger 28 immediately brings in another blank from the stack of blanks in runway 32, which blank forces the cut blank through the spring loaded gage 138 and into the delivery tube 42, where it falls into a receptacle or box for catching the finished work. The new blank brought in by plunger 28 is now held against the gage 138 and then staked on the arbor 95, when the process above described is repeated, making the machine entirely automatic in all its parts.

It will be understood, of course, that the various portions of my machine could be used with the others or in connection with features greatly modified. It will also be understood that cams and arrangements of levers and other such operating parts could be greatly modified without departing from the spirit of my invention. In short, I do not wish to be understood as limiting myself to one particular form, arrangement and grouping of these several features, elements or parts; but I have presented here that form of machine which I am now using, with the intention of having it taken in a sense diagrammatic or descriptive of that class of machines which could be produced and any one of which would contain the substance of all or most of my invention.

I claim:

1. In an automatic pinion cutting machine, a runway, apertures through said runway, a notch in said runway, a lever pivotally connected on said runway, a projection on said lever, which projection enters the runway adjacent to said notch and a spring on said lever to maintain its projection in said runway.

2. In an automatic pinion cutting machine, a runway, a notch in said runway, apertures through said runway, means for alining the aperture of a gear blank with said apertures, said means comprising a plunger in said runway, a lever pivotally connected to the runway, a projection on said lever which enters the runway through said notch and a spring for resiliently holding said projection in the runway, substantially as shown and described.

3. In an automatic pinion cutting machine, a runway, a notch in the upper part of said runway, apertures in each side of said runway, means for alining the aperture of a gear blank with said apertures, said means comprising a plunger in said runway, a lever pivotally mounted on said runway, a projection on said lever, which enters the runway through said notch and a spring on said lever resiliently forcing the projection into the runway, substantially as shown and described.

4. In an automatic pinion cutting machine, a runway, a notch in the upper part of said runway, apertures in each side of said runway, means for bringing a gear blank into axial alinement with said apertures, said means comprising a plunger in said runway, a lever pivotally mounted on said runway adjacent to said notch, a projection on said lever which enters the runway through said notch and resilient means for retaining said projection in said runway, substantially as shown and described.

5. In an automatic pinion cutting machine, a closed runway, two opposite staking abutments forming a part of the sides thereof, apertures in said abutments, an opening in the upper part of said runway adjacent to said apertures, means for bringing the aperture of a gear blank into axial alinement with said apertures, said means comprising a plunger in said runway, a lever pivoted on said runway, a projection on said lever which passes into said runway through said opening and resilient means for retaining said lever against the upper portion of said runway, substantially as shown and described.

6. In an automatic pinion cutting machine, a runway situated between two staking abutments, apertures in said abutments, apertures in said runway in line with the apertures in said abutments, a notch in said runway, means in said runway for bringing the aperture of a gear blank in line with the above mentioned apertures, said means comprising a plunger in said runway, a lever pivoted to said runway, a projection on said lever which enters the notch in said runway, and resilient means for retaining said projection in said runway, substantially as shown and described.

7. In an automatic pinion cutting machine, a runway situated between two staking abutments, apertures through said runway through which passes a staking arbor, a notch in said runway, means in said runway for bringing the apertures of a blank in line with said arbor, and against a stop comprising a lever, one end of which is pivoted on the runway and the other end of which has a projection entering said runway, and a spring retaining said lever in said notch, substantially as described and for the purpose set forth.

ANDREW H. NEUREUTHER.

Witnesses:
Oscar W. Dauber,
William A. Radtke.